United States Patent [19]

Masegi

[11] Patent Number: 4,558,260
[45] Date of Patent: Dec. 10, 1985

[54] HEAD LAMPS CONTROL SYSTEM FOR USE ON VEHICLES

[75] Inventor: Mitsuhiko Masegi, Nukata, Japan

[73] Assignee: Nippondenso Co., Ltd., Kariya, Japan

[21] Appl. No.: 606,686

[22] Filed: May 3, 1984

[30] Foreign Application Priority Data

May 4, 1983 [JP] Japan .................................. 58-78648

[51] Int. Cl.⁴ ............................................. B60Q 1/02
[52] U.S. Cl. .................................. 315/82; 307/10 LS; 315/77; 315/149
[58] Field of Search ........................... 315/82, 77, 149; 307/10 LS

[56] References Cited

U.S. PATENT DOCUMENTS 3,391,302 7/1968 Weingarden ........................... 315/82
3,818,267 6/1974 Hill et al. ................................ 315/82

FOREIGN PATENT DOCUMENTS 682639 3/1964 Canada .

Primary Examiner—Harold Dixon
Attorney, Agent, or Firm—Cushman, Darby & Cushman

[57] ABSTRACT

A head lamps control system for use on a vehicle for turning on and off the head lamps of the vehicle according to the brightness of the outside of the vehicle, in which a flip flop circuit is set upon closing of an ignition switch and in this set condition it receives power from a DC power source of the vehicle via a fuse to make on-off control for the head lamps in accordance with a signal provided from a photosensor which detects the outside brightness. To the above fuse is connected a load other than this system, and in the event the above fuse opens due to some trouble of such load, power can be fed to this system from a power supply path via the ignition switch, to prevent the head lamps from suddenly going off.

4 Claims, 1 Drawing Figure

U.S. Patent  Dec. 10, 1985  4,558,260
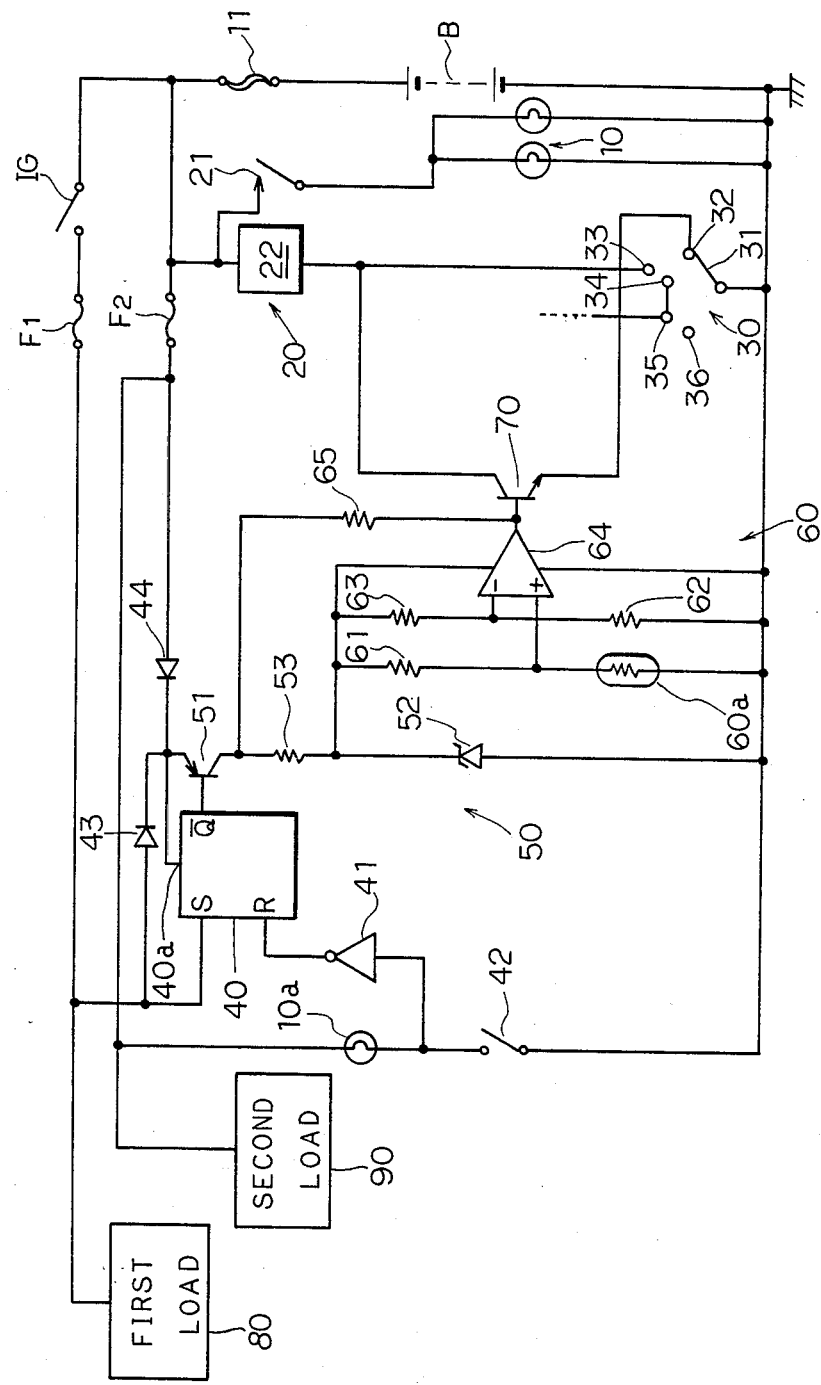

HEAD LAMPS CONTROL SYSTEM FOR USE ON VEHICLES

BACKGROUND OF THE INVENTION

The present invention relates to a control system for automatically turning on and off vehicular head lamps.

As this type of a vehicular head lamps control system, there has heretofore been known, for example, Japanese Utility Model Laid-open Publication No. 58-2139, a control system composed of a photosensor for detecting the quantity of light around a vehicle and producing a detected signal; a reference signal generating means for generating a reference light quantity signal corresponding to the darkness required for lighting vehicular head lamps; an output signal generating means adapted to operate upon receipt of a supply voltage from a DC power source of the vehicle, compare the value of the detected signal with that of the reference signal and produce an output signal when it judges that the outside of the vehicle is dark; a flip flop circuit responsive to closing of an ignition switch of the vehicle to receive at an input terminal thereof the supply voltage from the DC power source through the ignition switch and a first fuse and produce a supply voltage retaining signal from an output terminal thereof; an auxiliary power supply means adapted to operate upon receipt at a control terminal thereof the supply voltage retaining signal from the flip-flop circuit, receive at an input terminal thereof the supply voltage from the DC power source through a second fuse and provide this supply voltage from an output terminal thereof to the output signal generating means; and drive means for lighting the head lamps in response to said output signal and turning off the head lamps in response to the extinction of said output signal. In such a head lamps control system, usually a plurality of different loads are connected to power supply lines via the first and second fuses.

In the thus-constructed vehicular head lamps control system, when the second fuse is in a normal condition, the head lamps can be automatically turned on and off according to the brightness of the exterior of the vehicle by the supply of power from the vehicular battery via the second fuse. However, in the event of a sudden failure of the second fuse due to some trouble of a load via the second fuse or bite-in of the power supply line extending from the second fuse to the flip flop circuit, there arises the problem that, although this system is in a normal condition, the supply of power is cut off, thus making impossible the normal automatic lighting and turning off of the head lamps. This means that in the event the second fuse suddenly opens while the vehicle is running under the light of the head lamps during the night, the head lamps suddenly come off against the driver's will. As a result, a smooth running of the vehicle is impeded.

SUMMARY OF THE INVENTION

It is therefore a primary object of the present invention to provide a head lamps control system for use on a vehicle which system is capable of preventing automatically lit head lamps of the vehicle from turning off against the driver's will upon failure of the foregoing second fuse.

Another object of the present invention is to provide a head lamps control system for use on a vehicle which system is capable of keeping head lamps lit even after failure of the foregoing second fuse and informing the driver of the failure of the second fuse through a change in the lighting condition of the head lamps after turning off of the ignition switch.

BRIEF DESCRIPTION OF THE DRAWINGS

The drawing is an electric circuit diagram showing an embodiment of the present invention.

DESCRIPTION OF THE PREFERRED EMBODIMENT

An embodiment of the present invention will be described hereinunder with reference to the accompanying drawing.

Head lamps 10 are connected at one ends thereof to a positive terminal of a DC power source B of a vehicle via a normally open switch 21 of a relay 20 and a fusible link 11, and the lamps 10 go on upon receipt of power from the DC power source B in response to closing of the switch 21. The relay 20 has an electromagnetic coil 22, which closes the switch 21 upon receipt of power from the DC power source B. The reference numeral 30 denotes a lighting switch mounted within the room of the vehicle. Contact of a movable contact 31 with a fixed contact 32 both of the lighting switch 30 means that the head lamps 10 are placed under automatic lighting control. Contact of the movable contact 31 with fixed contacts 33 and 34 of the lighting switch 30 means a manual lighting of the head lamps 10 and tail lamps of the vehicle. Further, contact of the movable contact 31 with a fixed contact 35 of the lighting switch 30 means a manual lighting of the tail lamps.

An automatic lighting controller has an RS flip flop 40, an inverter 41, a door switch 42 and diodes 43 and 44 which constitute a principal portion of the present invention. The RS flip flop 40 is a Set preference type and is connected at its Set terminal S to the positive terminal of the DC power source B via a fuse $F_1$, an ignition switch IC of the vehicle and the fusible link 11, and is connected at its Reset terminal R to ground via the inverter 41 and the door switch 42. The door switch 42 produces (or extinguishes) a closing signal in response to closing (or opening) of a door of the vehicle. The RS flip flop 40 receives the supply voltage from the DC power source B via fuse $F_1$ in response to closing of the ignition switch IG and produces from its output terminal $\overline{Q}$ a low level signal as a supply voltage retaining signal, and maintains the generation of this supply voltage retaining signal independently of the opening of the ignition switch IG. After opening of the ignition switch IG, the RS flip flop 40 extinguishes the supply voltage retaining signal under control of the inverter 41 which is responsive to the closing signal provided from the door switch 42. The fuse $F_1$ is for protecting the ignition circuit of the vehicle and it opens when the power capacity fed from the DC power source B exceeds a predetermined tolerance value. The numeral 10a denotes a room lamp adapted to light in response to the closing signal from the door switch 42, and the numeral 40a denotes a power receiving terminal (connected to the emitter of a transistor 51) of the RS flip flop 40.

The diode 43, which is connected at its anode to the ignition switch IG via fuse $F_1$, conducts upon receipt of the supply voltage from the DC power source B via fuse $F_1$ in response to closing of the ignition switch IG, develops the supply voltage at its cathode, and is cut off from the DC power source B and ceases to conduct upon opening of the ignition switch IG. The diode 44, which is connected at its anode to the fusible link 11 via fuse $F_2$, conducts upon receipt of the supply voltage from the DC power source B via fuse $F_2$, develops the supply voltage at its cathode and becomes non-conductive upon blowing-out of the fuse $F_2$.

An auxiliary power supply circuit 50 has a transistor 51 as well as a Zener diode 52 and a resistor 53 which are connected in series to constitute a constant voltage circuit. The transistor 51 is connected at its base to the output terminal $\overline{Q}$ of the RS flip flop 40 and at its emitter to the cathodes of the diodes 43 and 44. In response to the supply voltage retaining signal provided from the RS flip flop, the transistor 51 conducts and develops at its collector the supply voltage provided from the diodes 43 and 44, and ceases to conduct upon extinction of the supply voltage retaining signal and stops the generation of the supply voltage. The Zener diode 52 receives the supply voltage from the collector of the transistor 51 and develops a constant voltage at its cathode.

A photosensor 60a comprises a cadmium sulfide (CdS) cell and it is provided at a suitable place of the vehicle. The photosensor 60a receives a constant voltage from the Zener diode 52 via a resistor 61, detects the darkness around the vehicle and produces a detected voltage. In this case, the internal resistance value of the photosensor 60a is in inverse proportion to the darkness (i.e., smallness of the quantity of light) around the vehicle.

A comparator circuit 60 has a pair of resistors 62 and 63 which are connected in series with each other to form a voltage divider, and a comparator 64. The resistor 62 is connected at one end thereof to ground and at the other end to the cathode of the Zener diode 52 via the resistor 63. The resistor 62 divides the constant voltage provided from the Zener diode 52 in cooperation with the resistor 63 and outputs the voltage obtained as a reference voltage from a connection terminal (i.e., output terminal) which is common to the resistor 63. The reference voltage from the resistor 62 is here assumed to indicate that the darkness around the vehicle requires lighting of the head lamps 10. The comparator 64 produces a high level signal (or a low level signal) when the detected voltage provided from the photosensor 60a is higher (or lower) than the reference voltage provided from the resistor 62. The numeral 65 denotes a resistor, which functions to supply the current developed at the collector of the transistor 51 to a driving transistor 70.

The driving transistor 70 is connected at its base to the output terminal of the comparator 64 and also to the collector of the transistor 51 via the resistor 65. The driving transistor 70 is further connected at its emitter to ground via the fixed contact 32 and movable contact 31 of the lighting switch, and at its collector to the positive terminal of the DC power source B via the electromagnetic coil 22 and fusible link 11 of the relay 20. The driving transistor 70 conducts in response to a high level signal provided from the comparator 64 and ceases to conduct in response to a low level signal from the comparator 64. This means that the electromagnetic coil 22 of the relay 20 is supplied with power from the DC power source B through the fusible link 11 in response to conducting of the driving transistor 70 and that the power supply from the DC power source B is cut off in response to non-conducting of the driving transistor 70.

To the power supply line via fuse $F_1$ is connected a first load 80 (e.g. an electronic control type automatic transmission, an electronic control type skid control system), and to the power supply line via fuse $F_2$ is connected a second load 90 (e.g. a watch, a courtesy lamp).

In this embodiment constructed as above, if it is assumed that the vehicle is brought into a running upon condition through operation of the ignition switch IG closing of its doors, the RS flip flop 40 receives the supply voltage from the power supply source B via fuse $F_1$ and produces a supply voltage retaining signal from its output terminal $\overline{Q}$, whereupon the transistor 51 conducts to receive the supply voltage from the DC power source B via fuse $F_1$ and diode 43 and also via fuse $F_2$ and outputs the supply voltage from its collector, and the Zener diode 52 receives the supply voltage from the transistor 51 via resistor 53, develops a constant voltage and provides it to the photosensor 60a and comparator circuit 60.

When the vehicle is running in the daytime, the detected voltage provided from the photosensor 60a is lower than the reference voltage from the resistor 62 of the comparator circuit 60, so that the comparator 64 produces a low level signal, rendering the driving transistor 70 non-conductive, whereupon the electromagnetic coil 22 of the relay 20 is no longer supplied with power from the DC power source B and keeps the switch 21 open. Consequently, the head lamps 10 are kept off.

On the other hand, when the vehicle is brought into a running condition in the nighttime, the surroundings of the vehicle are dark and the detected voltage from the photosensor 60a is higher than the reference voltage from the resistor 62, so that the comparator 64 produces a high level signal to render the driving transistor 70 conductive, whereupon the electromagnetic coil 22 of the relay 20 is supplied with power from the DC power source B to close the switch 21, thereby turning on the head lamps 10.

Thereafter, even if the vehicle is stopped running and the ignition switch IG is opened, the RS flip flop 40 retains its Set state, so that the head lamps are kept lit. When a door is opened for getting off the vehicle, the door switch 42 is closed to reset the RS flip flop 40, so that the head lamps 10 go off.

On the other hand, while the vehicle is running in the nighttime under lighting of the head lamps 10, in the event the fuse $F_2$ suddenly opens due to some trouble of the second load 90 or bite-in of the power supply line between the fuse $F_2$ and the diode 44, the transistor 51 remains conducting under generation of the supply voltage retaining signal from the RS flip flop 40 even if the diode 44 is cut off from the DC supply source B; the Zener diode 52 receives the supply voltage from the DC supply source B via fuse $F_1$, diode 43, transistor 51 and resistor 53 and continues to generate the constant voltage; and the comparator circuit 60 keeps the generation of the high level signal. Consequently, the driving transistor 70 continues to be conductive and the relay 20 keeps the switch 21 closed, so the head lamps 10 remains lit. Thus, even in the event of a sudden blowing-out of the fuse $F_2$ while the vehicle is running in the nighttime, the head lamps 10 continue to light without going off against the driver's will, and therefore the driver can continuously ensure a smooth and safe running of the vehicle. In this case, if the vehicle is stopped running and the ignition switch IG is opened, the head lamps 10 immediately go off because there is no longer supply of power to the auxiliary power supply circuit 50. Thus, if the fuse $F_2$ is in a normal condition, the head lamps 10 continue to light until the door is opened after opening of the ignition switch IG, while if the fuse $F_2$ has blown, the head lamps 10 go off upon opening of the ignition switch IG, and therefore the blowing-out of the fuse $F_2$ can be detected through a change in the turning-off timing of the head lamps 10.

Moreover, even in the event the fuse $F_1$ suddenly opens when the fuses $F_1$ and $F_2$ are in a normal condition and the head lamps 10 are lighting automatically, the RS flip flop 40 continues to assume its set state and the supply voltage from the DC power source B is fed to the auxiliary power supply circuit 50 via the diode 44, so that the head lamps 10 continues to light. In this case, if the flip flop circuit 40 is once reset by opening the door to turn off the head lamps 10, the RS flip flop 40 is not set so the the head lamps 10 do not go on even if the ignition switch IG is later closed, from which it is possible to detect a blow-out of the fuse $F_1$.

The diode 43 prevents an erroneous power supply to the first load 80 from the power supply line via the fuse $F_2$, and the diode 44 prevents an erroneous power supply to the second load 90 from the power supply line via fuse $F_1$ and diode 43.

Although in the above embodiment the RS flip flop 40 is reset by the door switch 42, a timer adapted to operate after opening of the ignition switch IG may be used to reset the RS flip flop after the lapse of a predetermined time. Alternatively, the RS flip flop 40 may be reset when the lighting switch is turned off or when the photosensor detects that the outside of the vehicle grew light.

What is claimed is:
1. A head lamps control system for use on a vehicle, comprising:
   (a) head lamps of the vehicle;
   (b) a DC power source of the vehicle;
   (c) a first load adapted to receive power from said DC power source via an ignition switch and a first fuse;
   (d) a flip flop circuit adapted to receive at an input terminal thereof a supply voltage fed to said first load and produce a supply voltage retaining signal from an output terminal thereof;
   (e) a second load adapted to receive power from said DC power source via a second fuse;
   (f) A first diode with anode connected to the input terminal of said flip flop circuit;
   (g) a second diode with anode connected to a power supply line between said second fuse and said second load and with cathode connected to the cathode of said first diode;
   (h) an auxiliary power supply means adapted to operate upon receipt at a control terminal thereof the supply voltage retaining signal from said flip flop circuit, receive at an input terminal thereof the supply voltage from said DC power source via the cathode of said first and second diodes and output this supply voltage;
   (i) a detector means for detecting a quantity of light around the vehicle and producing a detected signal;
   (j) an output signal generating means adapted to operate upon receipt of the supply voltage from said auxiliary power supply means and generate an output signal upon judging that the outside of the vehicle is dark on the basis of the detected signal provided from said detector means; and
   (k) a drive means for turning on the head lamps in response to the output signal from the output signal generating means.

2. A head lamps control system for use on a vehicle according to claim 1, further comprising a reset means for resetting said flip flop circuit so that the reset timing is capable of shifting from the timing at which said ignition switch turns off.

3. A head lamps control system for use on a vehicle according to claim 2, wherein said reset means is a door switch.

4. A head lamps control system for use on a vehicle according to claim 1, wherein said auxililary power supply means comprises a transistor adapted to receive at the base thereof the supply voltage retaining signal from said flip flop circuit and with emitter connected to the cathodes of said first and second diodes, as well as a resistor and a Zerner diode which are connected in series with the collector of said transistor, with the supply voltage being output from the junction between said resistor and said Zener diode.

* * * * *